United States Patent [19]
Meyer et al.

[11] 3,731,309
[45] May 1, 1973

[54] DOPPLER RADAR SIMULATOR

[75] Inventors: Bennett A. Meyer, Port Chester; Thomas A. Burns, New York; Peter Anelli, Ossining, all of N.Y.

[73] Assignee: The Singer Company, Little Falls, N.J.

[22] Filed: Nov. 8, 1971

[21] Appl. No.: 196,326

[52] U.S. Cl. ................343/17.7, 35/10.4, 343/5 DP
[51] Int. Cl. ..............................................G01s 7/40
[58] Field of Search.......................343/5 DP, 17.7; 35/10.4

[56] References Cited

UNITED STATES PATENTS

| | | |
|---|---|---|
| 3,365,719 | 1/1968 | Williams...............................343/17.7 |
| 3,404,399 | 10/1968 | Eschner, Jr..........................343/5 DP |
| 3,633,173 | 1/1972 | Edge...............................343/5 DP X |
| 3,077,039 | 2/1963 | Crawford et al......................35/10.4 |
| 3,471,858 | 10/1969 | Seyl et al.............................343/17.7 |

*Primary Examiner*—Malcolm F. Hubler
*Attorney*—S. A. Giarratana et al.

[57] ABSTRACT

A Doppler radar simulator is provided for generating signals for testing Doppler radar navigational systems. The Doppler simulator of the invention utilizes digital techniques in order to perform with the required high degree of accuracy and precision for the proper simulation of Doppler radar navigational system. The simulator of the invention utilizes shift registers and other components to generate, on a digital basis, the required Doppler simulation signals and wide band background noise.

9 Claims, 6 Drawing Figures

INVENTORS
BENNETT A. MEYER
THOMAS A. BURNS
PETER ANELLI

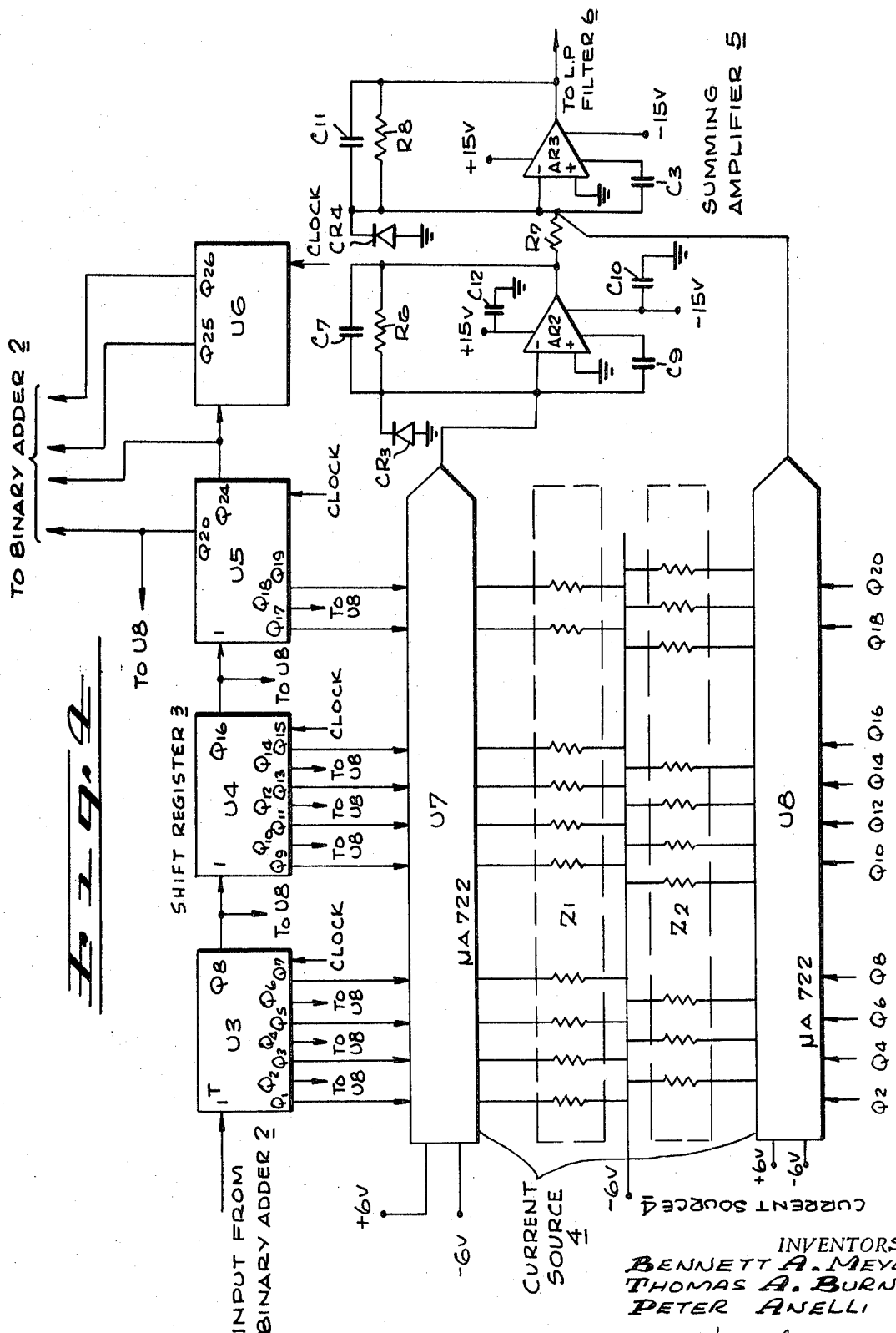

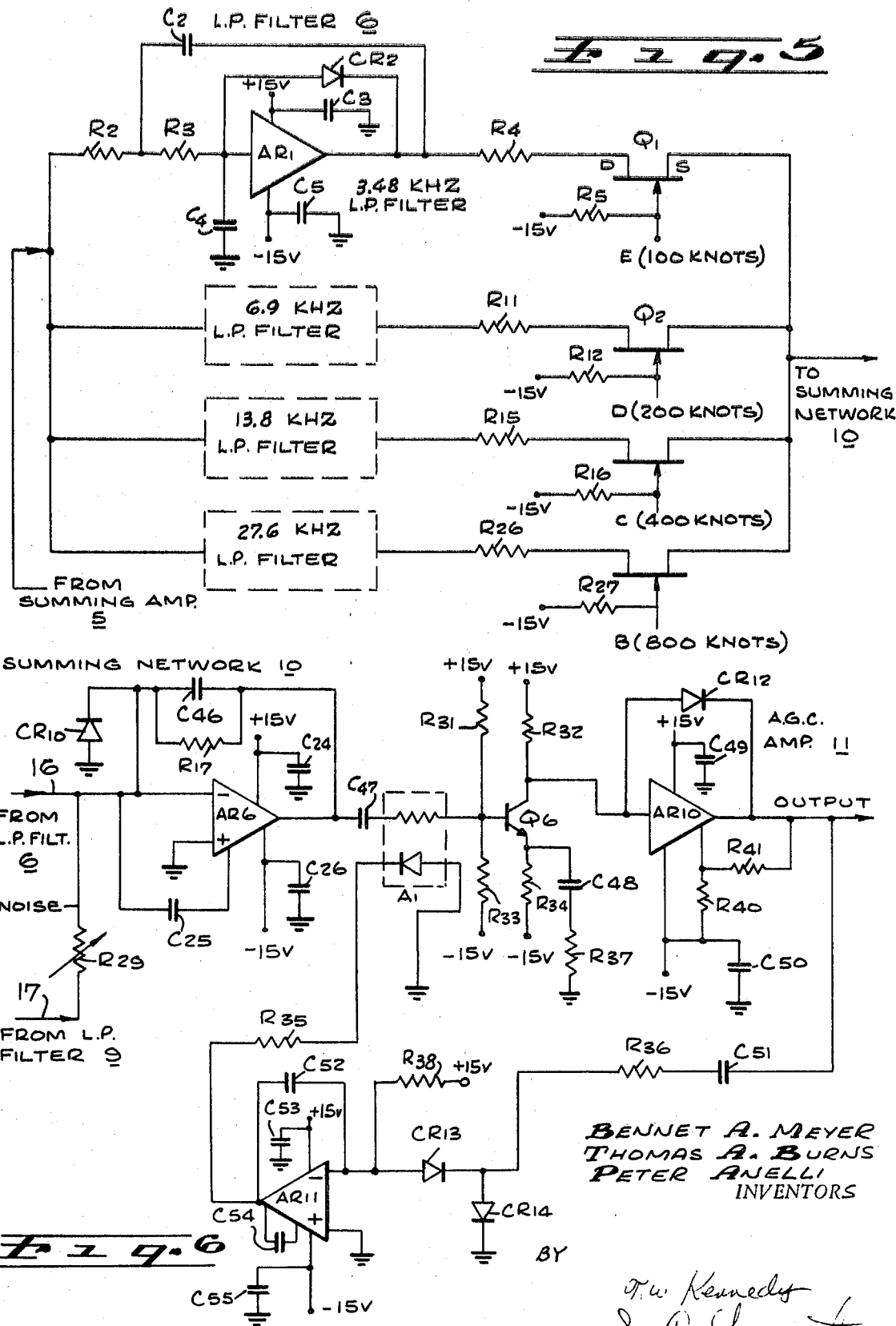

DOPPLER RADAR SIMULATOR

BACKGROUND OF THE INVENTION

It is most important for Doppler radar navigational systems to be tested in a laboratory environment. This is achieved by appropriate simulator apparatus. Such apparatus must generate, in the laboratory, signals which duplicate the in-flight conditions encountered by the actual Doppler radar equipment installed in the aircraft. The signals from the simulator are used to test the radar system over its entire range of operations. When such tests are properly conducted, the operation of the airborne radar system can be checked out completely in the laboratory or repair shop, so as to insure that the radar equipment will perform properly under actual in-flight conditions.

In order to test the frequency tracker of a Doppler navigational system, for example, a simulated Doppler signal must be produced whose spectral density has a Gaussian distribution about a nominal center frequency. The value of the nominal center frequency of the Doppler spectrum is directly related to the velocity of the vehicle, and different values of simulated velocity may be produced by the simulator by changing the center frequency. The width of the Doppler spectrum, expressed as a percentage of the center frequency, is fixed for a particular airborne radar system, and the same fixed width must be simulated in the simulated Doppler signal.

The actual Doppler signal is essentially narrow band in nature, and it is mixed with wide band background noise. Therefore, a similar signal must be produced by the simulator, and presented to the receiver of the airborne radar unit under test. It is also essential for the wide band background noise generated by the simulator to have a uniform spectral density over the entire response range of the frequency tracker of the radar equipment under test. The Gaussian Doppler spectrum has a noiselike character, that is, the Doppler signal has the aforesaid Gaussian spectral density, but it has a voltage function of time which resembles a random signal. The voltage probability distribution, however, is also Gaussian. Therefore, within such constraints of the spectral and amplitude distributions, the actual Doppler signal is random.

Then, by variation of the signal-to-noise ratio, of the simulated Doppler signal, the acquisition point and noise degradation performance of the actual airborne radar system can be checked. The signal-to-noise ratio of the simulated Doppler Gaussian signal may be changed, for example, by varying the amount of wideband background noise added in the simulation of the signal.

The prior art Doppler simulators, for the most part, utilize analog techniques and circuitry. Specifically, the prior art simulator is usually composed of circuits, such as amplifiers, variable filters, attenuators, multipliers, modulators, and the like. The simulated noise is usually generated in the prior art analog simulator by Zener diodes or gas discharge tubes. However, since the simulator must perform with a high degree of accuracy, and since each component must exhibit a corresponding high degree of linearity and precision, the prior art analog equipment of necessity is complex and expensive.

For example, in order for a prior art simulator to be effective, it must have the following elements: a wide band background noise source having a spectral flatness to within a fraction of a decibel; a precision low pass filter able to maintain its roll-off response and filter widths within a narrow tolerance and with no pass band ripple; a balanced modulator having an extremely high degree of rejection of carrier and spurious signals, together with a flat band pass response; a partition filter having a sharp low pass cutoff at the specified frequency, and having a minimum of pass band ripple; a variable attenuator exhibiting a high degree of precision since its output is used to determine the simulated signal-to-noise ratio; and all amplifiers which process the simulated Doppler signal must have an extremely flat frequency response.

The digital Doppler simulator of the present invention, unlike the prior art analog systems, fulfills the aforesaid criteria by relatively simple and inexpensive circuitry. In addition, the digital simulator of the invention is not subject to drift over periods of time, or with changes of temperature, and, unlike the prior art analog systems, it does not require frequent recalibration. An added advantage insofar as the digital simulator of the present invention is concerned is that it is simple to operate and to interpret, and it does not require complex test set-ups and verification techniques.

BRIEF DESCRIPTION OF THE DRAWINGS

FIG. 4 is a more detailed diagram, partly in block form and partly in circuit detail, of certain components of the system of FIG. 1;

FIG. 5 is a more detailed diagram, partly in block form and partly in circuitry, of a low pass filter component of the system of FIG. 1; and FIG. 6 is a diagram, partly in block form and partly in circuit detail, of other components of the system of FIG. 1.

DETAILED DESCRIPTION OF THE ILLUSTRATED EMBODIMENT

Figure 1:
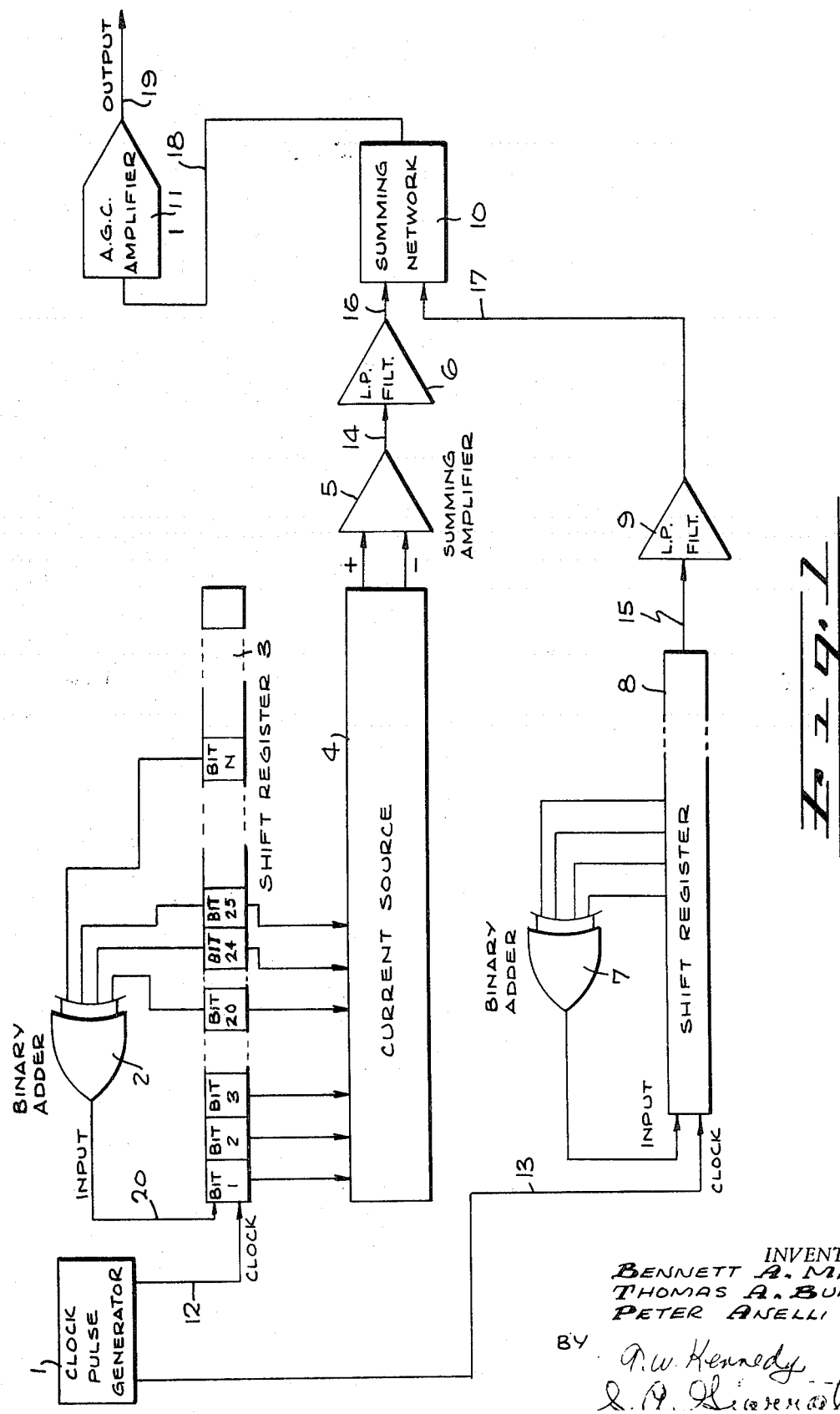
FIG. 1 is a block diagram of a Doppler radar simulator constructed to incorporate the concepts of the invention.

The digital Doppler simulator shown in FIG. 1 includes a clock pulse generator 1 which generates digital pulse train signals to be used by the components of the simulator. Clock frequencies are changed when different velocities and different signal-to-noise ratios are simulated, as will be described.

The system of FIG. 1 also includes a Doppler signal generating channel which consists of a binary adder 2, a shift register 3, a current source 4, a summing amplifier 5, and a low pass filter 6.

The circuits of the Doppler signal generating channel produce a simulated Doppler signal which is mixed with wide band background noise in a summing network 10. The wide band background noise is generated by a wide band noise generating circuit consisting of a binary adder 7, a shift register 8, and a low pass filter 9.

The summing network 10 forms a signal-to-noise ratio network which combines the simulated Doppler signal from the Doppler generating channel with the wide band background noise from the noise generating circuit to form a composite Doppler signal. The resulting composite Doppler signal from the summing network 10 is passed through an automatic gain controlled amplifier 11 which regulates the level of the composite Doppler signal, so that the root-mean-square output of the simulator of FIG. 1 may remain constant.

Within the Doppler signal generating channel, the shift register and the binary adder 2 comprise a pseudo-random binary noise generator. The binary noise produced by this generator is passed through a special purpose digital filter formed by the shift register 3, the current source 4 and the summing network 5. The simulated Doppler signal appears at the output of the digital filter. The shift register 3, therefore, is used for the dual purpose of pseudo-random noise generation as well as for digital filtering.

The Doppler simulator system of FIG. 1 is required to generate a simulated Doppler signal having a relatively narrow band pass spectral shape in the frequency domain, and having a spectral density which is absolutely symmetrical about a center frequency $f_0$. The band width, measured from the three decibel point below $f_0$ to the three decibel point above $f_0$, must be a fixed percentage of $f_0$, and may have a typical value, for example, of 13.2 percent. The band width percentage is a parameter of the particular airborne radar system being tested, and must remain fixed.

Different values of velocity may be simulated by providing different values for the center frequency $f_0$. Since the percentage band width must remain constant, the absolute value of band width must be increased as $f_0$ is increased, and vice versa. The simulated Doppler signal produced by the system has a noiselike nature in that its amplitude is a random function of time. The amplitude probability distribution of the time-voltage function, however, has a Gaussian distribution, as does the frequency-amplitude distribution function.

The shift register 3 contains, for example, N binary bit position cells, and each bit position cell can contain either a binary "1" or a binary "0." The clock pulses from the clock pulse generator 1 are introduced to the shift register 3, and upon the occurrence of each clock pulse, each bit in the shift register shifts one cell to the right in accordance with usual shift register operation. The bit at the extreme right of the register is shifted out and is lost.

The output of the binary adder 2 is connected to the input of the shift register, so that for each shift of the shift register, a new bit is shifted into the bit 1 position of the register from the output of the binary adder 2. The inputs of the binary adder, as shown, may be connected to any selected bit position cells of the shift register and, in the illustrated embodiment, are shown as connected to the bit 20, bit 24, bit 25 and bit N position cells respectively. The binary adder takes the binary sum of the four bits which are wired to its inputs, and presents one of the bits of the sum, for example, the least significant bit, to the input of the shift register.

The sequence of binary "1's" and "0's" fed to the input of the shift register 3 by the binary adder 2 comprises a pseudo-random sequence. From time to time, the pseudo-random sequence will repeat. However, by means of the components described as shown in FIG. 1, the sequence repetition time may be made relatively long and may, for example, be in the order of minutes. It should be pointed out that the repetition time for the sequence depends upon the bits selected to be fed to the binary adder 2. For example, for a relatively long sequence repetition time, the bits to which the binary adder 2 is connected should be selected so that the number of bits in the sequence is $(2^N-1)$ where N is the bit position of the rightmost bit connected to the binary adder. For any specific assignment of N, the rightmost bit connected to the binary adder, there are only a few permissible combinations of bits to which the other inputs can be connected, in order to secure a relatively long repetition time.

The shift register 3 which is used in the pseudo-random noise source described immediately above, is also used in the Doppler signal generating channel which, as previously mentioned, consists of the shift register 3, in conjunction with the current source 4 and the summing amplifier 5. The successive bits from the shift register starting at the bit 1 position cell are all wired to the current source 4. Then, as the shift register is operated, current through the current source 4 is controlled depending upon whether a binary "0" or a binary "1" is shifted into a particular bit position cell.

The current source 4, as will be described, is made up of a series of sections, each including a precision fixed resistor. Each section, in turn, is wired to a corresponding bit position of the shift register 3. Then, the total output current of the source 4 is determined by the number of individual sections which are turned on by the presence of binary "0's," for example, in the bit position cells of the shift register to which such sections are connected, and by other sections which are turned off by the presence, for example, of binary "1's" in the bit position cells of the shift register to which the latter sections are connected. The total current from the current source 4 is summed by the summing amplifier 5, and is converted by the summing amplifier to a voltage signal. Since a random number is shifted through the shift register 3, the amplitude of the output voltage signal from the summing amplifier 5 varies for each successive clock period.

If the shift register 3 is considered to be filled with binary "1's," except for the leftmost bit position, which is a binary "0," then upon each successive clock pulse, a binary "1" will be shifted into the register, so that at all times the register will contain only a single binary "0" in a single cell, and all the other cells will contain binary "1's." Then, as the register shifts, the single binary "0" will be shifted through the register from left to right, and will successfully occupy each cell of the register. As the binary "0" is shifted through the register, it will turn on the section of the current source 4 which is connected to the cell occupied by the binary "0" at any particular time. All other sections of the current source 4 will be turned off, since their cells contain binary "1's."

Figure 2:
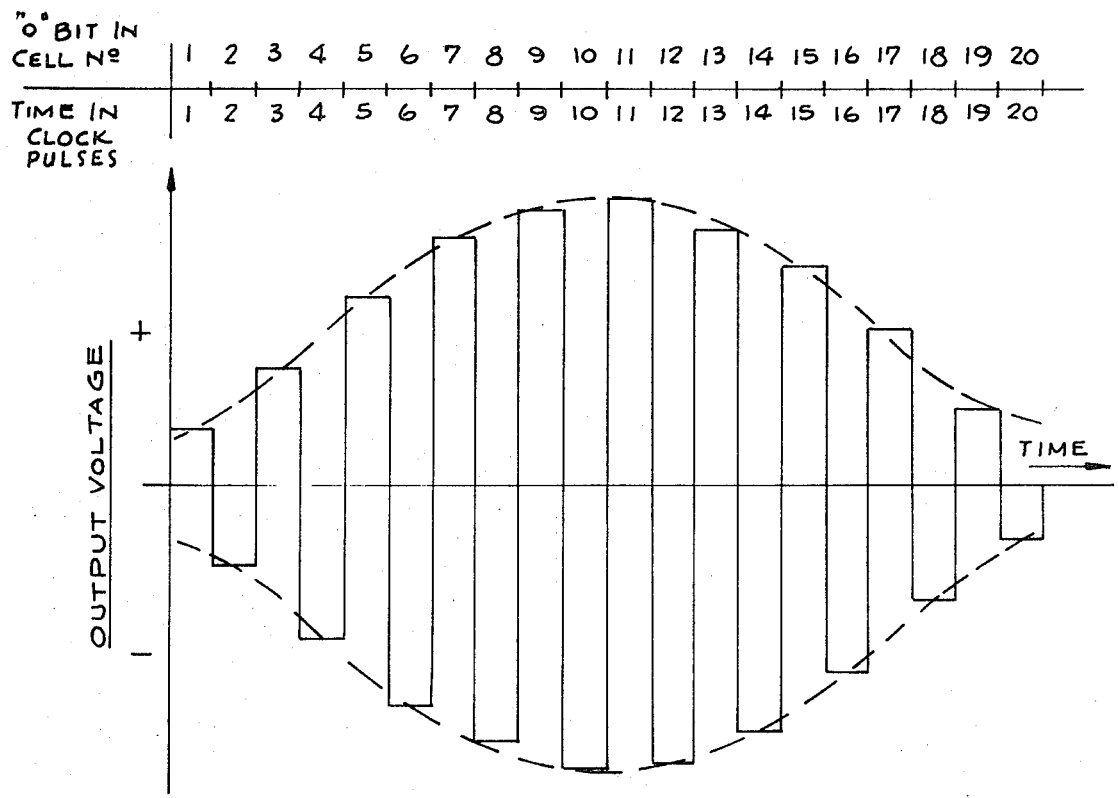
FIGS. 2 and 3 are curves useful in understanding the operation of the system of FIG. 1.

The value of the precision resistor in each section of the current source 4 is selected so that the output waveform from the summing amplifier 5 will conform with the curve shown in FIG. 2. It will be observed by inspection of the curve of FIG. 2 that the resultant output produced by a single binary "0" shifting through the register is an envelope of positive and negative square pulses increasing in amplitude and then decreasing. The coefficients of the sections in the current source 4 are selected so that the envelope, as shown, in dotted lines in the curve of FIG. 2, will conform to the function:

$$f(t) = Ve^{-at^2}$$

Since the special case shown in the curve of FIG. 2 is the result of supplying a single pulse to the sections of the current source 4, the curve depicts the impulse response of the digital filter formed by the shift register 3, the current source 4 and summing amplifier 5. The signals shown in the curve of FIG. 2 appear at the output of the summing amplifier 5 on the lead 14. At the output of the low pass filter 6, on the lead 16, the signal has the form shown by the curve of FIG. 3.

Figure 3:
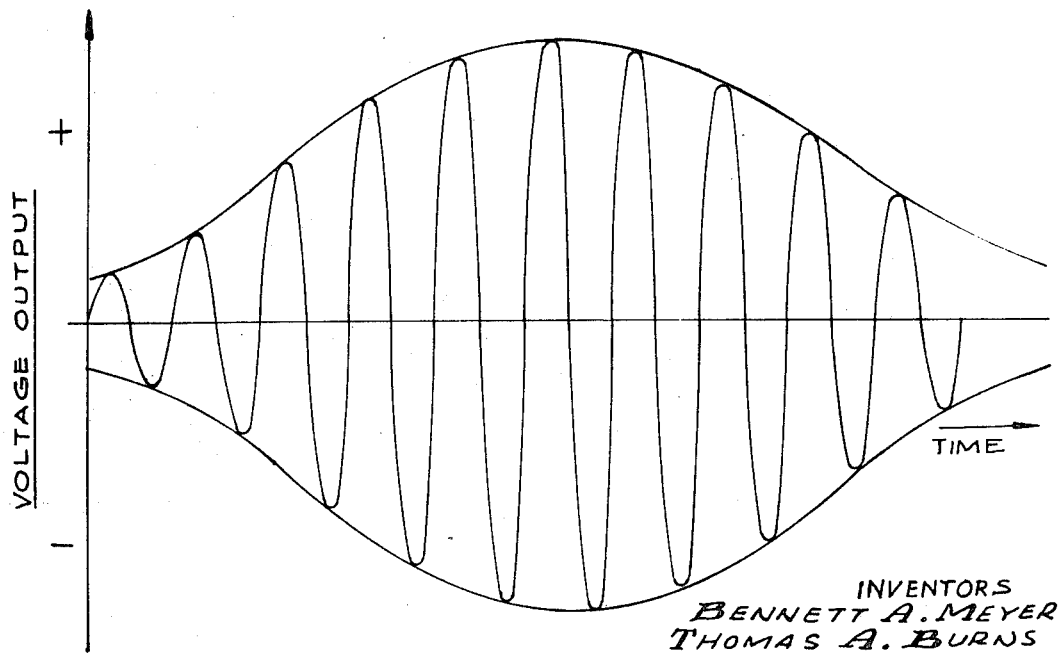

The clock frequency on the lead 12 from the clock pulse generator 1, as introduced to the shift register 3, is $2f_0$. It can be seen, therefore, that the voltage waveform of FIG. 3, is given by:

$$f(t) = e^{-at^2} \sin(2\pi f_0 t) \quad (1)$$

The Fourier transform of this function is:

$$F(w) = ce^{-(1/4a)(w - 2\pi f_0)} \quad (2)$$

By proper selection of the constants, any desired spectrum width can be produced. Therefore, the Doppler generator of FIG. 1 operates by producing a synthesis of the desired impulse response. The spectral density function shown in Equation (2) above exactly satisfies the necessary requirements that have been imposed on the simulated Doppler signal. In normal operation, of course, the Doppler generator of FIG. 1 operates with a pseudo-random binary signal, rather than a single impulse. Any random binary signal can be considered as a train of pulses, each with a different time delay, so that the impulse response analysis is valid for any such signal.

As mentioned above, the wide band background noise for the generated Doppler signal is provided by a second shift register 8 in conjunction with a binary adder 7. The latter elements function in the same manner as the elements 2 and 3 to produce a pseudo-random sequence. The pseudo-random output is taken, for example, from the rightmost bit of the shift register 8 and is passed through the low pass filter 9, so that the output from the low pass filter consists of noise which is band-limited to the range of interest, and which has a uniform spectral density up to the cut-off frequency.

The wide band noise present on the lead 17 in FIG. 1 from the output of the low pass filter 9 is mixed with the Doppler signal present on the lead 16 in the summing network 10. The output of the summing network is then amplified by the automatic gain controlled amplifier 11 to provide the output from the simulator system on the lead 19, and which is available for use in testing airborne Doppler navigation systems.

In order to change the simulated signal-to-noise ratio, the frequency of the clock pulses supplied to the shift register 8 over the lead 13 is varied. For example, as the clock frequency increases, the spectral density of the pseudo-random noise on the leads 15 and 17 changes. Frequencies have been selected to provide exact simulation of the signal-to-noise ratios required for test purposes. Therefore, by controlling the frequency of the clock pulses on the lead 12 which are supplied to the shift register 3, the simulated speed may be controlled, and by controlling the frequency of the clock pulses on the lead 13, the simulated signal-to-noise ratio may be controlled.

The components which make up the shift register, current source 4, and summing amplifier 5 are shown in somewhat more detail in FIG. 4. As shown in FIG. 4, the shift register 3 may be made up of four integrated circuits of the type presently designated DM8570 and which are designated U3, U4, U5 and U6 respectively. Each of the integrated circuits forms a shift register, and in the illustrated embodiment, the circuits are connected in series so as to synthesize a shift register having, for example, 26 successive bit cell positions, which are designated Q1–Q26 in FIG. 4. In the illustrated embodiment in FIG. 4, the bit cells Q20, Q24, Q25 and Q26 are connected to the binary adder 2, and the bit cells Q1–Q20 are wired to the current source 4.

The current source 4 in the illustration of FIG. 4 is made up of two integrated circuit logic switching networks designated U7 and U8. These switching networks may be Fairchild Semiconductor Company's type $\mu$A722. The logic switching circuits U7 and U8 are connected to the bit cell positions Q1–Q20 of the shift register 3, as shown, and are connected to precision resistors included in impedance blocks designated $Z_1$ and $Z_2$ respectively. The logic network U8 produces eventual negative outputs, and the logic network U7 produces eventual positive outputs. As binary "1's" and binary "0's" are successively shifted through the shift register 3, each bit cell containing a binary "0" enables the corresponding current sources so that a net current may be introduced to the summing amplifier 5. The amount of current supplied by each individual current source, when enabled, is controlled by its corresponding precision resistor.

The summing amplifier 5, as shown in FIG. 4, is made up of two operational amplifiers designated AR2 and AR3. These amplifiers may be of the type designated LM101A, which is manufactured by National Semiconductor Co. The output from the network U7 is connected to the inverting input terminal of the amplifier AR2, whereas the output from the logic circuit U8 is connected to the inverting input terminal of the operational amplifier AR3. The positive inputs of the amplifiers AR2 and AR3 are connected to a point of reference potential, such as ground. The output of the amplifier AR2 is introduced through a 1 kilo-ohm resistor R7 to the inverting input of the amplifier AR3. The output from the amplifier AR3 therefore is a voltage signal whose positive excursions are generated by U8 and whose negative excursions are generated by U7, it being further understood that U7 and U8 only supply negative currents to summing amplifier 5.

The low pass filter 6, as shown in FIG. 5, is actually made up of a plurality of separate low-pass filters, which are designed to pass, without attenuation, frequencies such as 3.48 KHz, 6.9 KHz, 13.8 KHz and 27.6 KHz.

The four filters are connected through individual switching circuits formed, for example, by field effect transistors Q1, Q2, Q3 and Q4 so that the filters may be selectively switched to the signal-to-noise summing network 10. Appropriate controls are exerted on the field-effect transistors, so that the transistor Q1, for example, is switched on by the application of a switching signal to the input terminal E for a simulated velocity, for example, of 100 knots; the transistor Q2 is switched on by a switching signal at the input terminal D for a velocity of 200 knots; the transistor Q3 turned on by a switching signal at the input terminal C for a velocity of 400 knots; and the switching transistor Q4 is turned on by a switching signal at the input terminal B for a velocity of 800 knots. The appropriate switching signal is developed in correspondence with the clock signals applied to the shift register 3, so that the filter circuits enabled, process the same velocity that is being simulated by register 3.

The 3.48 KHz low pass filter includes, for example, an operational amplifier designated AR1, the output of which is connected to the drain electrode of the field effect transistor Q1 through a 10 kilo-ohm normalizing resistor R4. The amplifier AR1 may be of the type designated LM110. The output of the amplifier AR1 is connected to a capacitor C2 having a capacity, for example, of 910 picofarads, and which is connected to the junction of a pair of resistors R2 and R3 in the input to the amplifier AR1. The resistor R2 may have a resistance of 34.8 kilo-ohms, and the resistor R3 may have the same resistance. The input to the amplifier AR1 may be connected to a grounded capacitor C4 having a capacity, for example of 470 picofarads.

The circuitry of the other filters in FIG. 5 may be the same as that described above. However, the values of the resistors R2 and R3 in each of the filters will be selected in accordance with the desired characteristics of each filter. Also, the resistors R11, R15 and R26 which correspond respectively to the resistor R4 may have values, for example, of 7.071 kilo-ohms, 5 kilo-ohms, 3.536 kilo-ohms, respectively.

The summing network 10 in FIG. 1 is shown in more detail in FIG. 6, as is the automatic gain controlled amplifier 11. The summing network 10, for example, includes an operational amplifier AR6 which may be of the type designated LM101A. The lead 16 from the low pass filter 6 is connected to the negative input terminal of the operational amplifier AR6, and the lead 17 from the low pass filter 9 is connected through a 10 kilo-ohm variable resistor R29 to the negative input terminal of the operational amplifier. The positive input terminal is grounded. The output of the operational amplifier AR6 is connected to a coupling capacitor C47 which may have a capacity, for example, of 39 microfarads.

The coupling capacitor C47 is connected through a gain control unit A1 to the base electrode of an NPN transistor Q6 in the automatic gain controlled amplifier 11. The collector of the transistor Q6 is connected to the input of an operational amplifier AR10 which, likewise, may be of the type designated LM110, and the output of the system appears at the output of the operational amplifier AR10. The output of the operational amplifier AR10 is also connected to a coupling capacitor C51 which may have a capacity of 39 microfarads, and which is connected through a 15 kilo-ohm resistor R36 and a peak rectifier circuit, consisting of diodes CR13 and CR14, to the negative input of an operational amplifier AR11, which amplifier may be of the type designated LM101A, and which serves as an integrator. The positive input of the operational amplifier AR11 is grounded, and its output is connected through a 1 kilo-ohm resistor R35 and through a light emitting diode in the automatic gain control unit A1 to ground.

The transistor Q6 may be of the type designated 2N2222A. Its base is connected to the common junction of a 51 kilo-ohm resistor R31, and a 20 kilo-ohm resistor R33. The resistor R31 is connected to the positive terminal of the 15 volt voltage source, and the resistor R33 is connected to the negative terminal. The collector of the transistor Q6 is connected to the positive terminal of the 15 volt voltage source through a 10 kilo-ohm resistor R32, and the emitter is connected to the negative terminal of the source through a 7.5 kilo-ohm resistor R34. The emitter of the transistor Q6 is also connected to a 39 microfarad capacitor C48 which, in turn, is connected to a grounded 1 kilo-ohm resistor R37. The negative input of the amplifier AR11 is connected to a 1 megohm resistor R38 to the positive terminal of the 15 volt source.

Any increase in the output from the amplifier AR10 causes a corresponding increase in the output from the amplifier AR11. This, in turn, decreases the current flow through the light-emitting diode in the unit A1 which increases the impedance of the light-sensitive resistor in the unit so as to produce a corresponding decrease in the input to the transistor Q6, and through the transistor to the amplifier AR10. In this way, the amplifier AR10 is controlled, to regulate the level of the composite simulated Doppler signal appearing at the output of the system, so as to maintain the output RMS voltage essentially constant.

The invention provides, therefore, an improved Doppler simulator system in which equipment complexity is drastically reduced as compared with the prior art analog systems, and which operates with a high degree of precision with respect to the spectrum width of the generated Doppler signal, and in which the spectrum width percentage is invariant as the speed changes. The system of the invention uses digital circuitry, as described above, which affords more stability over time and temperature. Moreover, the digital system of the invention is easier to test and maintain than the prior art analog systems; and it is smaller in size and weight, as well as being materially lower in cost. The digital simulator of the invention has a precisely known bias, and has zero fluctuation. Moreover, signal-to-noise simulation is exact, and is determined digitally.

The simulator of the invention is capable of being controlled by a computer in an automatic test set-up. In addition, a long calibration cycle can be used of the order, for example, of one year. Since the width of the Doppler spectrum simulated by the system of the invention remains a fixed percentage of the Doppler center frequency ($f_0$), the actual width of the Doppler spectrum can be set to any desired value; this being achieved by one adjustment only, namely by a variation of the center frequency $f_0$. This latter feature is an advantage over the usual prior art analog simulators, in which a separate filter had to be provided for each desired spectrum width.

The Doppler simulator of the invention incorporates a unique digital filter which is used to produce simulated Doppler signals, and which produces a spectral signal with a precisely determined shape, and with precise symmetry. The use of such digital filtering techniques provides simulated Doppler signals having an invariant spectrum width, when expressed as a fraction of center frequency, as is desired. The broad band background noise source used to provide variable background noise is such that the spectral density can be controlled by changing its clock frequency which, in turn, controls the simulated signal-to-noise ratio.

Due to the digital nature of the Doppler simulator of the invention, test and check-out is an extremely simple operation, requiring no complex pieces of test equipment, and check-out can be performed by a relatively unskilled test operator. The use of digital techniques and integrated circuits reduces the complexity and bulk of the simulator system of the invention. For example, the equipment described herein has been packaged on two printed circuit cards which contain all the circuitry including switches. This is to be compared with the earlier analog Doppler systems which have used nine printed circuit cards, and have required a large amount of associated components and wiring.

It will be appreciated that while a particular embodiment of the invention has been shown and described, other embodiments may be used. For example, instead of using the two separate pseudo-random shift registers 3 and 8 of FIG. 1, a single unit could be used. Also, since the shift register 3 of FIG. 1 serves a dual function as a pseudo-random sequence generator and digital filter, it may be replaced by two separate shift registers for each of the two functions, without departing from the concept of the invention.

Moreover, by proper suitable choice of parameters, the filters 6 and 9 of FIG. 1 may be combined into a single filter interposed between the summing network 10 and AGC amplifier 11. The current source 4 in FIG. 1 could be replaced by a voltage source, if so desired. Also, the spectral shape of the generated signal may be changed from Gaussian to any desired shape without departing from the spirit of the invention. The design procedure would be similar to the one described herein involving the determination of a Fourier transform pair, and the implementation of the impulse response by means of current source coefficients.

The modifications of the invention which are believed to come within the spirit and scope of the invention are set forth in the following claims.

What is claimed is:

1. A Doppler radar simulator system for generating simulated Doppler radar signals comprising:
   a first pseudo-random digital noise source;
   a special purpose digital filter coupled to said source for producing a symmetrical band-passed signal of a predetermined center frequency and of a spectrum width which is a predetermined fixed fraction of said center frequency, and of a predetermined shape to constitute the simulated Doppler radar signals;
   a second pseudo-random digital noise source to produce wide band background noise for the simulated Doppler radar signals; and
   summing means having inputs coupled to the outputs of said special purpose digital filter and said second pseudo-random digital noise source providing the sum of said two inputs as an output, said output thereby simulating a composite Doppler return containing both signal and noise.

2. The system defined in claim 1, and which includes clock signal generating means for producing a variable frequency clock signal to said first pseudo-random digital noise source to control the spectral center frequency and bandwidth thereof and thereby control the simulated velocity of the system.

3. The system defined in claim 1, and which includes a clock signal generating means for producing a clock signal for said second pseudo-random digital noise source with a variable frequency to control the spectral density of the noise signal from said second source thereby to provide variable background noise and to control the simulated signal-to-noise ratio of the simulated composite Doppler radar signals produced by the system.

4. The system defined in claim 1, in which said second pseudo-random digital noise source includes a multi-bit shift register, and a binary adder having a plurality of inputs connected to different bit positions of said shift register to sample a plurality of bits therefrom and having its output connected to the input of said shift register to introduce a selected bit of the sum of said plurality of bits to said register.

5. The simulator system defined in claim 1, in which said digital filter and second pseudo-random noise source are coupled to said summing means by respective first and second low pass filter means for limiting the band width of the signals from said digital filter and from said second pseudo-random noise source.

6. The simulator system defined in claim 5, and which includes an automatic gain controlled amplifier connected to the output of said summing means.

7. The system defined in claim 1, in which said first pseudo-random digital noise source includes a multi-bit shift register means and a binary adder having a plurality of inputs connected to different bit positions of said shift register means to sample a plurality of bits therefrom and having its output connected to the input of said shift register means to introduce a selected bit of the sum of the aforesaid bits to said shift register means.

8. The system defined in claim 7, in which said digital filter comprises said multi-bit shift register means, and a signal source having a plurality of inputs connected to said shift register means to sample a plurality of bits therefrom, and to generate an output signal whose amplitude is dependent upon the bit distribution within said shift register means.

9. The simulator system defined in claim 7, in which said digital filter includes a plurality of circuits, and logic circuitry connecting said circuits to said shift register means selectively to switch said circuits to positive and negative output signals in response to the bit disposition in said shift register means, and a summing network connected to said individual circuits to produce an output signal having an amplitude determined by the switching of said circuits by said logic circuitry.

* * * * *